(12) United States Patent
Ishii et al.

(10) Patent No.: US 6,525,705 B1
(45) Date of Patent: Feb. 25, 2003

(54) LIQUID CRYSTAL DISPLAY DEVICE HAVING A REDUNDANT CIRCUIT

(75) Inventors: Masahiro Ishii, Mobara (JP); Kikuo Ono, Mobara (JP); Masuyuki Ota, Mobara (JP); Yoshiaki Nakayoshi, Mobara (JP); Nobuyuki Suzuki, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/560,145

(22) Filed: Apr. 28, 2000

(30) Foreign Application Priority Data

May 10, 1999 (JP) .......................................... 11-128393

(51) Int. Cl.⁷ ................................................ G09G 3/36
(52) U.S. Cl. .............................. 345/87; 345/89; 345/90; 345/92; 345/93
(58) Field of Search ............................. 345/87, 89, 90, 345/92, 93; 359/59; 340/784; 313/494; 257/291

(56) References Cited

U.S. PATENT DOCUMENTS

| | | | | |
|---|---|---|---|---|
| 5,045,753 A | * | 9/1991 | Katayama et al. ........... | 313/494 |
| 5,063,378 A | * | 11/1991 | Roach .......................... | 340/784 |
| RE33,829 E | * | 2/1992 | Castleberry .................. | 340/784 |
| 5,132,820 A | | 7/1992 | Someya et al. ............... | 359/59 |
| 5,164,851 A | * | 11/1992 | Kanemori ..................... | 359/59 |
| 5,331,447 A | | 7/1994 | Someya et al. ............... | 359/59 |
| 5,528,396 A | | 6/1996 | Someya et al. ............... | 359/59 |
| 5,598,285 A | | 1/1997 | Kondo et al. ................. | 349/39 |
| 5,608,245 A | * | 3/1997 | Martin ......................... | 257/291 |
| 6,111,558 A | * | 8/2000 | Jeung et al. .................. | 345/93 |
| 6,310,667 B1 | | 10/2001 | Nakayoshi et al. ........... | 349/42 |

FOREIGN PATENT DOCUMENTS

JP           63-309921           6/1987

OTHER PUBLICATIONS

Mamoru Takeda, Shinichi Kogo, Tatsuhiko Tamura, Hiroaki Ueura, Hitoshi Moda, Ichiro Yamashita, Takao Kawaguchi, Ohkura Ando, Akira Kuroda 12.5–inch active matrix color liquid crystal [LC] display adopting a redundant configuration, Nikkei Electronics, pp. 193–210, Dec. 16, 1986, published by Nikkei McGraw–Hill Co. (Japanese article and English translation).

* cited by examiner

*Primary Examiner*—Bipin Shalwala
*Assistant Examiner*—Prabodh Dharia

(57) ABSTRACT

In a liquid crystal display device having a repair line for replacing a signal line disconnected in a display area thereof and extended from one side thereof to another side thereof opposite to the one side thereof, there is provided a signal amplifier on a circuit board arranged at the one side thereof. Since the circuit board supplies control signals to a signal driver circuit which outputs a video signal or the like to be transferred by the repair line toward another side of the liquid crystal display device, the video signal can be amplified by the signal amplifier before its waveform is deformed on its way through the repair line. Therefore, the video signal can be supplied to a part of the disconnected signal line at the another side of the liquid crystal display device by preventing the video signal from being deformed and delayed.

16 Claims, 8 Drawing Sheets

LIQUID CRYSTAL DISPLAY DEVICE HAVING A REDUNDANT CIRCUIT

BACKGROUND OF THE INVENTION

The present invention relates to a liquid crystal display device, and in particular to an active matrix type liquid crystal display device employing active elements such as thin film transistors.

The liquid crystal display devices are beginning to be widely used as display terminals of information processing equipment (office automation equipment) such as personal computers for their thinness, light weight and display quality comparable to that of cathode ray tubes.

The active matrix type liquid crystal display device has a plurality of nonlinear elements (active elements, switching elements) each associated with a respective one of a plurality of pixel electrodes arranged in a matrix. The liquid crystal at each pixel in the active matrix type liquid crystal display device is driven at all times in theory (i.e. with the duty ratio of 1.0), and consequently the active matrix type liquid crystal display device provides higher contrast ratio than the so-called simple matrix type liquid crystal display device employing time-multiplex driving, and the active matrix type driving is becoming indispensable especially for the color liquid crystal display device. One of representative active elements is a thin film transistor (TFT).

The active matrix type liquid crystal display device using thin film transistors is disclosed in Japanese Patent Application Laid-open Sho 63-309921 and "12.5-inch diagonal active-matrix type color liquid crystal display employing a redundant configuration" NIKKEI ELECTRONICS, pp. 193–210, Dec. 15, 1986, published by NIKKEI McGRAW-HILL Co., for example.

The liquid crystal display device (or the liquid crystal module) includes a liquid crystal display element (or a liquid crystal display panel, a LCD (Liquid Crystal Display device), a backlight disposed below the liquid crystal display element to serve as a planar lighting source for the liquid crystal display element, driving circuit boards disposed around the periphery of the liquid crystal display element, a plastic molded case for housing and holding therein the liquid crystal display element and the backlight, an upper metal shield case having a display window and housing the above-mentioned components and a lower metal shield case housing the above-mentioned components in cooperation with the upper metal shield case. The above-mentioned liquid crystal display element includes a pair of opposing and spaced insulating substrates made of material such as glass or plastic with transparent display electrodes and orientation films stacked thereon facing each other, a sealing member in the form of a rectangular peripheral frame for sealing the periphery of the two insulating substrates, liquid crystal material filled into the space between the two insulating substrates via a filling hole for the insertion of the liquid crystal material formed in the rectangular peripheral frame of the sealing member, and a pair of polarizers disposed below and above the liquid crystal display element for polarizing and analyzing light, respectively.

Liquid crystal display devices are manufactured using high manufacturing techniques in extremely dust-free environment, but a defective display called "a line defect" sometimes occurs which displays a line formed of pixels turned OFF or ON at all times on a display screen when a line among signal lines for display is broken.

Liquid crystal display elements having this line defect are screened out in the step of product inspection and are discarded, and consequently, the manufacturing yield rate of the liquid crystal elements is deteriorated and the production cost is increased. Consideration has been given to the need to repair the line defects.

FIG. 12 is a schematic plan view of a liquid crystal display element and driver circuit boards disposed around the periphery of the liquid crystal display element in a conventional liquid crystal display device.

Reference character LCD denotes a liquid crystal display element, SCR is a useful display area, GD are scanning signal drivers (driver ICs), GB is a scanning signal source circuit board, DD are video signal drivers (driver ICs), DB is a video signal source circuit board, CONT is a control circuit board, DATA are video signal lines, DAN is a point of a line open in one of the video signal lines DATA, DH is a line-open repair line, and CN1 and CN2 are first and second line-open repair connection points, respectively.

As shown in FIG. 12, a large number of video signal lines DATA are arranged in the useful display area SCR of the liquid crystal display device LCD. FIG. 12 illustrates that a line open occurred in one of the video signal lines DATA.

Video signals for display are supplied to the video signal lines DATA from the video signal drivers DD. But, if a point of the line open DAN occurs in one of the video signal lines DATA, the proper video signals can not be transferred downward from the point of the line open DAN in FIG. 12, and consequently, the above-explained defective display called the line defect occurs.

For eliminating the defective display caused by the line open, a conventional technique employs a U-shaped line-open repair line DH extending around the useful display area SCR on the liquid crystal display element LCD. With this configuration, if the point of the line open DAN occurs in the video signal line DATA, the video signal line DATA containing the point of the line open DAN is electrically connected to the line-open repair line DH by fusing the first and second line-open repair connection points by laser beam or the like so as to eliminate influence of the line open.

This conventional technique supplies the video signals to a portion of the video signal line DATA below the point of the line open DAN in FIG. 12 by first transferring the video signals to the line-open repair line DH via the first line-open repair connection point CN1 from the video signal driver DD and then to the portion of the video signal line DATA below the point of the line open DAN from the line-open repair line DH via the second line-open repair connection point CN2.

SUMMARY OF THE INVENTION

There is the following problem with this conventional technique.

It is necessary that the line-open repair line DH for transferring the video signals to the video signal line DATA containing a line open is disposed outside the useful display area SCR, and consequently, the route of the line-open repair line DH necessarily becomes long and therefore parasitic capacitance and resistance of the line-open repair line DH increases such that delay in the video signals is caused. That is to say, a difference of a time delay in the video signals is produced between the video signals supplied via the line-open repair line DH from the video signal driver DD because of its line open in the video signal line DATA and the video signals supplied directly from the video signal driver DD by the video signal line DATA having no line open. In a case where a uniformly gray image is displayed over the entire screen area, if the line-open repair line DH is used to repair a line open, a delicate difference in display brightness occurs forming a boundary on the point of the line open DAN, and deteriorates the quality of display compared with the liquid crystal display device having no points of the line open DAN.

It is an object of the present invention to provide a liquid crystal display device featuring a high quality display image and a high manufacturing yield by suppressing variations in brightness of the display screen due to delay in signals caused by repair of the line open in the signal lines.

To accomplish the above objects, in accordance with one embodiment of the present invention, there is provided a liquid crystal display device comprising: a pair of opposing substrates at least one of which is transparent; a liquid crystal layer sandwiched between the pair of opposing substrates; a plurality of scanning signal lines extending in a first direction on a surface of one of the pair of opposing substrates facing the liquid crystal layer and juxtaposed in a second direction transverse to the first direction; a plurality of video signal lines insulated from the plurality of scanning signal lines, extending in the second direction and arranged in the first direction; a plurality of pixel electrodes arranged in a matrix and each surrounded by two adjacent ones of the plurality of video signal lines and two adjacent ones of the plurality of scanning signal lines; a plurality of active elements each associated with one of the plurality of pixel electrodes, an output electrode thereof being connected to one of the plurality of pixel electrodes, a control electrode thereof being connected to one of the plurality of scanning signal lines and an input electrode thereof being connected to one of the plurality of video signal lines; a video signal line driver circuit disposed outside the matrix for supplying video signal voltages to each of the plurality of video signal lines; a scanning signal driver circuit disposed outside the matrix for supplying scanning signal voltages to each of the plurality of scanning signal lines; at least one line-open repair line extending near ends of one of (i) the plurality of scanning signal lines and (ii) the plurality of video signal lines opposite from output terminals of a corresponding one of (iii) the scanning signal driver circuit and (iv) the video signal driver circuit; the at least one line-open repair line being electrically connectable to an end of a signal line of a corresponding one of (i) the plurality of scanning signal lines and (ii) the plurality of video signal lines; and at least one signal amplifier connected to the at least one line-open repair line and being connectable to one of the output terminals of the corresponding one of (iii) the scanning signal driver circuit and (iv) the video signal driver circuit.

To accomplish the above objects, in accordance with another embodiment of the present invention, there is provided a liquid crystal display device comprising: a pair of opposing substrates at least one of which is transparent; a liquid crystal layer sandwiched between the pair of opposing substrates; a plurality of scanning signal lines extending in a first direction on a surface of one of the pair of opposing substrates facing the liquid crystal layer and juxtaposed in a second direction transverse to the first direction; a plurality of video signal lines insulated from the plurality of scanning signal lines, extending in the second direction and arranged in the first direction; a plurality of pixel electrodes arranged in a matrix and each surrounded by two adjacent ones of the plurality of video signal lines and two adjacent ones of the plurality of scanning signal lines; a plurality of active elements each associated with one of the plurality of pixel electrodes, an output electrode thereof being connected to one of the plurality of pixel electrodes, a control electrode thereof being connected to one of the plurality of scanning signal lines and an input electrode thereof being connected to one of the plurality of video signal lines; a video signal line driver circuit disposed outside the matrix for supplying video signal voltages to each of the plurality of video signal lines; a scanning signal driver circuit disposed outside the matrix for supplying scanning signal voltages to each of the plurality of scanning signal lines; at least one line-open repair line extending near ends of one of (i) the plurality of scanning signal lines and (ii) the plurality of video signal lines opposite from output terminals of a corresponding one of (iii) the scanning signal driver circuit and (iv) the video signal driver circuit; the at least one line-open repair line being electrically connectable to an end of a signal line of a corresponding one of (i) the plurality of scanning signal lines and (ii) the plurality of video signal lines; and the at least one line-open repair line being connected to an unused one of output terminals of driver ICs forming the corresponding one of (iii) the scanning signal driver circuit and (iv) the video signal driver circuit.

In the present invention, with the configuration having a signal amplifier connected to a line-open repair line, video signals to be transferred to a repaired video signal line via the repair line are amplified by the signal amplifier, and thereby a time delay of the video signals is reduced.

Also in the present invention, with the configuration in which a line-open repair line is connected to an unused one of signal output terminals of a driver IC disposed at an extreme end of the display screen which is not connected to any video signal lines, the required length of the line-open repair line is shortened and thereby a time delay of the video signals is reduced.

Usually, in both of these embodiments, each of the plurality of video signal lines is connected to pixels of the plurality of pixels arranged in a same column of the matrix via a respective one of the plurality of active elements, and each of the plurality of scanning signal lines is connected to the active elements associated with pixels of the plurality of pixels arranged in a same row of the matrix, usually. The at least one line-open repair line has at least one portion thereof which is disposed in a periphery of the one of the pair of the substrates and extends along the ends of either the plurality of the scanning signal lines or the plurality of the video signal lines juxtaposed in the periphery. The at least one portion of the at least one line-open repair line formed in this manner is extended on a side of the one of the pair of the substrates opposite to another side thereof at which input terminals of the plurality of the scanning signal lines or the plurality of the video signal lines for receiving signals from either the scanning signal driver circuit(s) or the plurality of the video signal driver circuit(s) are disposed. The at least one line-open repair line has another portion thereof which is extended along an extension direction of the at least one portion thereof disposed in the periphery of the one of the pair of the substrates. If the at least one portion is extended along the ends of the plurality of scanning signal lines, the another portion is disposed in another periphery of the one of the pair of the substrates and extends along the ends of the plurality of the video signal lines juxtaposed in the periphery, or is disposed on a circuit board on which the video signal driver circuit is mounted. In the latter case, the another portion may be disposed inside of the circuit board, when the circuit board has a multilayered structure.

These and other objects, features and advantages of the present invention will become more apparent from the following description when taken in conjunction with the accompanying drawings.

BRIEF DESCRIPTION OF THE DRAWINGS

In the accompanying drawings, in which like reference numerals designate similar components throughout the figures, and in which.

DETAILED DESCRIPTION OF THE PREFERRED EMBODIMENTS

Figure 1:
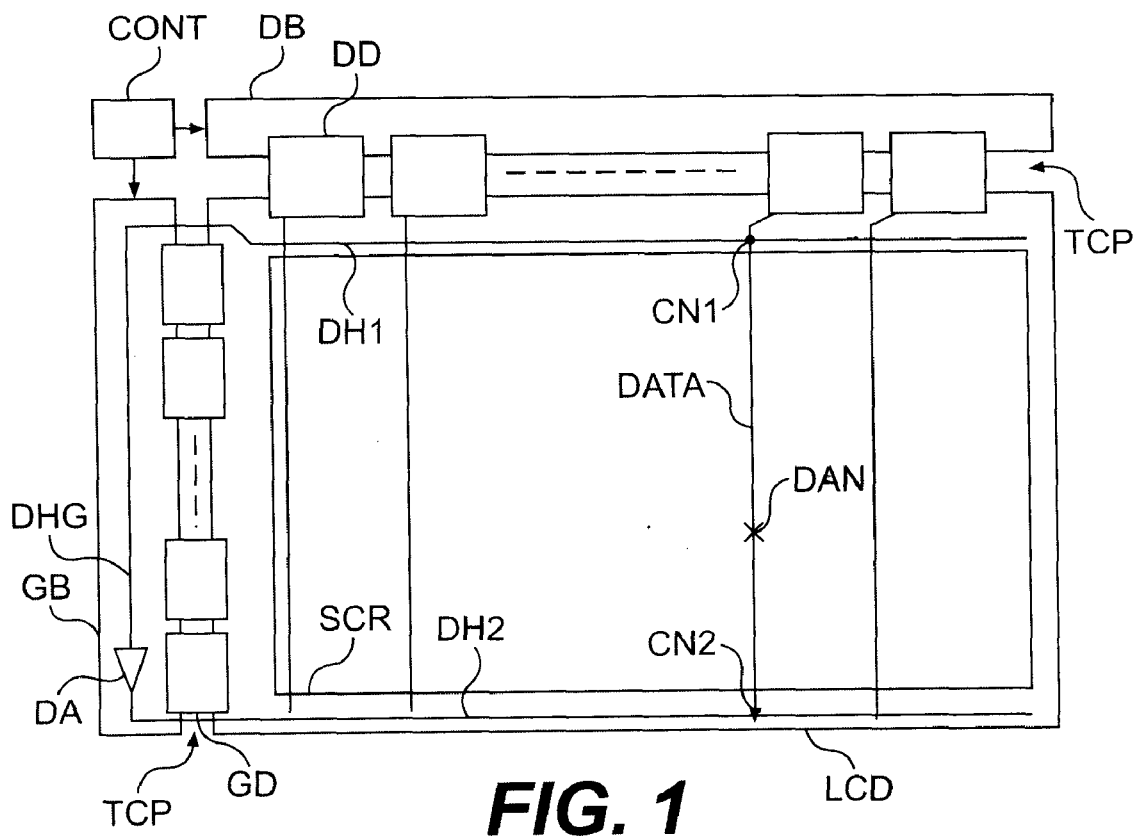
FIG. 1 is a schematic plan view of a liquid crystal display element and driver circuit boards disposed around the periphery of the liquid crystal display element, in accordance with an embodiment of the present invention.

The embodiments of the present invention will be explained in detail with reference to the drawings. The same reference numerals or characters designate functionally similar parts or portions throughout the figures, and repetition of their explanations is omitted.

Embodiment 1

FIG. 1 is a schematic plan view of a liquid crystal display element and driver circuit boards disposed around the periphery of the liquid crystal display element, in accordance with this embodiment of the present invention.

Reference character LCD denotes a liquid crystal display element, SCR is a useful display area, GD are scanning signal drivers (driver ICs), GB is a scanning signal source circuit board, DD are video signal drivers (driver ICs), DB is a video signal source circuit board, CONT is a control circuit board, DATA are video signal lines, DAN is a point of a line open in one of the video signal lines DATA, DH1, DH2 and DHG are line-open repair lines, CN1 and CN2 are first and second line-open repair connection points, respectively, and DA is a signal amplifier (a buffer amplifier).

In this embodiment, the scanning signal drivers GD, the video signal drivers DD are incorporated on tape carrier packages (TCP) mounted between the liquid crystal display element LCD and the scanning signal source circuit board GB and between the liquid crystal display element LCD and the video signal source circuit board DB, respectively.

As shown in FIG. 1, a large number of the video signal lines DATA extending in one direction (in a vertical direction in FIG. 1) are arranged in the useful display area SCR of the liquid crystal display element LCD.

The video signal lines DATA transfer signals supplied from the video signal drivers DD mounted between the liquid crystal display element LCD and the video signal source circuit board DB, to pixels in the useful display area SCR.

The scanning signal drivers GD mounted between the liquid crystal display element LCD and the scanning signal source circuit board GB are connected to the liquid crystal display element LCD. The pixels are driven based upon the video signals and the scanning signals to control light transmission through the liquid crystal layer and thereby to provide a desired image display.

The video signal source circuit board DB physically holds the video signal drivers DD in place and supplies control signals and DC voltages to the video signal drivers DD.

The scanning signal source circuit board GB physically holds the scanning signal drivers GD in place and supplies control signals and DC powers to the scanning signal drivers GD.

The control circuit board CONT converts video signals and DC powers supplied from information processing equipment such as personal computers into the proper control signals and the proper DC powers and supplies the control signals and the DC powers to the video signal source circuit board DB and the scanning signal source circuit board GB.

The following explains the repair of the line open in the video signal line DATA which is the feature of the present invention. FIG. 1 shows there is a point of the line open DAN in one of the video signal lines DATA which occurred during the fabrication process. Proper video signals are transmitted up to the point of the line open DAN in the video signal line DATA from the video signal driver DD, but they are not transmitted downward from the point of the line open DAN. The configuration for the repair of the line open is as follows.

The first and second line-open repair lines DH1, DH2 are provided on a transparent glass substrate (see FIGS. 8A–8C to be described subsequently) of the liquid crystal display element LCD. The line-open repair line nearer the video signal drivers DD is designated as DH1, and the line-open repair line remote from the video signal drivers DD is designated DH2. As shown in FIG. 1, the first and second line-open repair lines DH1, DH2 extend horizontally in such a direction to intersect the plural video signal lines DATA in a layer different from a layer containing the video signal lines DATA with an insulating layer interposed between the two layers, and the first and second line-open repair lines DH1, DH2 are formed on the same layer as the scanning signal lines simultaneously with the scanning signal lines, for example. It is preferable that the line-open repair lines DH1, DH2 and DHG are made wide for reduction of their resistance, and their width is chosen to be more than five times that of the video signal lines DATA, the same width as that of the scanning signal lines (25 μm in this embodiment).

The third line-open repair line DHG is provided on the scanning signal source circuit board GB for electrically connecting the first and second line-open repair lines DH1 and DH2. In this embodiment, a plurality of the video signal drivers DD are arranged along a first side of the liquid crystal display element LCD and a plurality of the scanning signal drivers GD are arranged along a second side of the liquid crystal display element LCD positioned in such a direction to intersect the first side. The first and second line-open repair lines DH1 and DH2 extend in parallel with a direction of the arrangement of the plurality of the video signal drivers DD, and the third line-open repair line DHG extends along a direction of the arrangement of the plurality of the scanning signal drivers GD. The third line-open repair line DHG may be disposed to extend along a third side of the liquid crystal display element LCD opposing the second side.

The third line-open repair line DHG on the scanning signal source circuit board GB is electrically connected to the first and second line-open repair lines DH1 and DH2 on the liquid crystal display element LCD, by using leads, dummy leads of the scanning signal drivers GD or other various ways.

In the above explanation, one set comprising the first and second line-open repair lines DH1, DH2 and the third line-open repair line DHG is employed, but the actual liquid crystal display devices may employ a plurality of sets comprising the first and second line-open repair lines DH1, DH2 and the third line-open repair line DHG because there is possibility that line opens occur in plural ones of the video signal lines.

An amplifier DA is provided for each of the third line-open repair lines DHG on (or inside) the scanning signal source circuit board GB as shown in FIG. 1. The amplifier DA is formed by a transistor, an OP amplifier or the like disposed on the scanning signal source circuit board GB, for example.

A method of repairing the line open by using the above configuration is explained as follows.

The video signal line DATA containing the point of the line open DAN is electrically connected to the first and second line-open repair lines DH1, DH2 disposed on the liquid crystal display element LCD by irradiating and fusing their two intersections with an insulating layer interposed therebetween, that is, the first and second line-open repair connection points CN1, CN2 with a high-power laser beam. Other various methods of connections such as using a conductive material can be used.

In the video signal line DATA containing the line open, video signals are transferred up to the point of the line open DAN directly from the video signal driver DD, and the video signals are transferred to the portion of the video signal line DATA lower than the point of the line open DAN from the video signal driver DD via the first line-open repair connection point CN1, the first line-open repair line DH1, the third line-open repair line DHG, the signal amplifier DA, the third line-open repair line DHG, the second line-open repair line DH2 and the second line-open repair connection point CN2 in the order named.

Although the signals transferred via the first line-open repair line DH1, the third line-open repair lines DHG and the second line-open repair line DH2 suffer a time delay due to parasitic capacitances and increase in resistance associated with the repair lines, the signal amplifier DA inserted between the third line-open repair lines DHG can suppress the time delay of the signals.

As a result, the portion of the video signal line DATA below the point of the line open DAN (the portion of the video signal line DATA cut off from the video signal driver DD at the point of the line open DAN) is supplied with approximately the same signals as those supplied to the portion of the video signal line DATA above the point of the line open DAN (the portion capable of receiving the video signals directly from the video signal driver DD), and consequently, a delicate difference in display brightness having a boundary on the point of the line open DAN due to the repair of the line open is suppressed.

In this embodiment, one set including the first and second line-open repair lines DH1, DH2, the third line-open repair line DHG and the signal amplifier DA is employed to repair only one of the video signal lines DATA suffering the line open, but it is needless to say that the liquid crystal display devices may employ a plurality of sets including the first and second line-open repair lines DH1, DH2, the third line-open repair line DHG and the signal amplifier DA by arranging the plural repair lines DH1, DH2, DHG in parallel with each other, respectively, for example, such that the plural video signal lines DATA suffering the line opens are repaired. This configuration having the plural sets each including the repair lines and the signal amplifier is applicable to the embodiments 2 to 6 explained subsequently.

Figure 2:
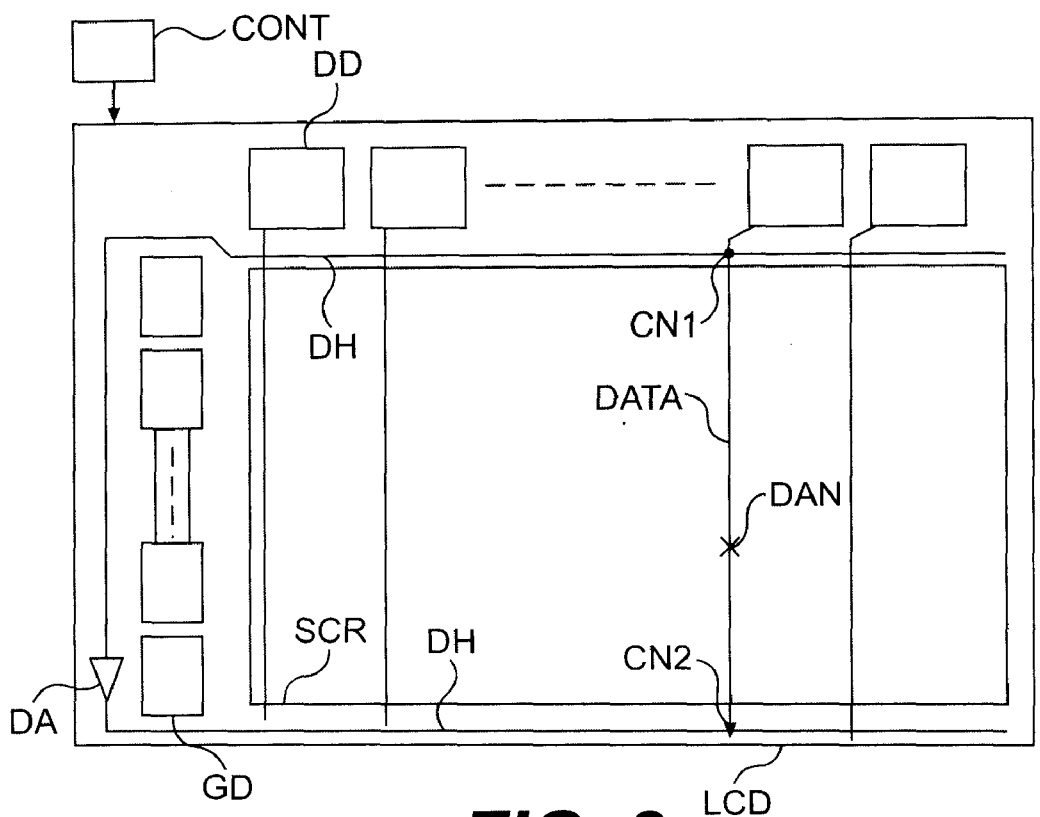
FIG. 2 is a schematic plan view of a flip chip type liquid crystal display element and a driver circuit board disposed around the periphery of the liquid crystal display element, in accordance with another embodiment of the present invention.

In this embodiment, the signal amplifier DA is disposed on the scanning signal source circuit board GB, but it may be disposed on a transparent glass substrate of the liquid crystal display element LCD and may be inserted in one of the first and second line-open repair lines DH1, DH2, for example. All the line-open repair lines DH1, DH2 and DHG may be arranged in the form of U on one transparent glass substrate as shown in FIG. 2. The signal amplifier DA may be disposed on the video signal source circuit board DB. It is preferable that the signal amplifier DA is disposed as close to the video signal driver DD as possible to reduce a time delay of signals.

The following explains the inspection procedure for detecting line opens in the video signal lines DATA briefly.

The line-open inspection is performed for screening out defective substrates by detecting line opens in the video signal lines and the scanning signal lines. The line-open inspection equipment usually comprises a DC power supply for generating arbitrary voltages, a probe electrically connected to the DC power supply, a DC ammeter, a pair of probes electrically connected to the DC ammeter, a substrate stage for mounting thereon a substrate of the liquid crystal display element (hereinafter referred to as a liquid crystal display substrate) to be inspected, and a drive mechanism for moving the probes vertically and horizontally.

The line-open inspection using this inspection equipment is performed as follows:

The liquid crystal display substrate is placed on the substrate stage, the two probes are brought into contact with two test terminals connected to both ends of one video signal line DATA, respectively, on the liquid crystal display substrate, by using the drive mechanism, a voltage is applied between the two ends of the video signal line from the DC power supply via the probes and the test terminals, and the presence or absence of a line open in the video signal line is judged by measuring a current through the video signal line with the ammeter and thereby calculating the resistance of the video signal line. The line open is judged to be present in the video signal line if the measured current is smaller than the predetermined lower threshold value. Next, the probes are moved to be in contact with test terminals adjacent to the above-mentioned test terminals by the drive mechanism so as to inspect another video signal line adjacent to the above-mentioned video signal line for a line open. The same inspection procedure is repeated for all the video signal lines DATA by moving the probes successively with the drive mechanism.

Other embodiments will be explained hereafter, but only portions different from those in Embodiment 1 will be explained without explaining portions in common with Embodiment 1.

Embodiment 2

FIG. 2 is a schematic plan view of a liquid crystal display element and a driver circuit board disposed around the periphery of the liquid crystal display element, in accordance with another embodiment of the present invention.

This embodiment is substantially similar to Embodiment 1, except that (i) the video signal drivers DD and the scanning signal drivers GD are mounted on the transparent glass substrate of the liquid crystal display element LCD (i.e. the FCA (Flip Chip Attachment) type, or the COG (Chip-On-Glass) type), (ii) the control circuit board CONT is connected to the liquid crystal display element LCD, (iii) the generally U-shaped line-open repair line DH is disposed on the transparent glass substrate of the liquid crystal display element LCD, and (iv) the signal amplifier DA is inserted in the line-open repair line DH on the transparent glass substrate of the liquid crystal display element LCD.

In this embodiment also like in Embodiment 1, the portion of the video signal line DATA below the point of the line open DAN is supplied with approximately the same signals as those supplied to the portion of the video signal line DATA above the point of the line open DAN, and consequently, a delicate difference in display brightness having a boundary on the point of the line open DAN due to the repair of the line open is suppressed.

That is to say, also in the liquid crystal display device of the flip chip attachment type having the video signal drivers DD and the scanning signal drivers GD mounted on the liquid crystal display element LCD, the repair of the line opens can be realized to provide a high quality display image.

In this embodiment, as shown in FIG. 2, portions of the line-open repair line DH extending horizontally in such a direction to intersect the plural video signal lines DATA are formed in a layer different from a layer containing the video signal lines DATA with an insulating layer interposed between the two layers, and is formed on the same layer as the scanning signal lines simultaneously with the scanning signal lines, for example. A portion of the line-open repair line DH extending vertically in parallel with the video signal lines DATA in FIG. 2 is formed on the same layer as the video signal lines DATA or the scanning signal lines simultaneously with the video signal lines DATA or the scanning signal lines, for example. If the horizontally extending portions and the vertically extending portion of the line-open repair line DH are formed on two layers different from each other, they are electrically connected via contact holes in the insulating layers. The signal amplifier DA comprises plural thin film transistors or the like formed on the transparent glass substrate, for example.

Embodiment 3

Figure 3:
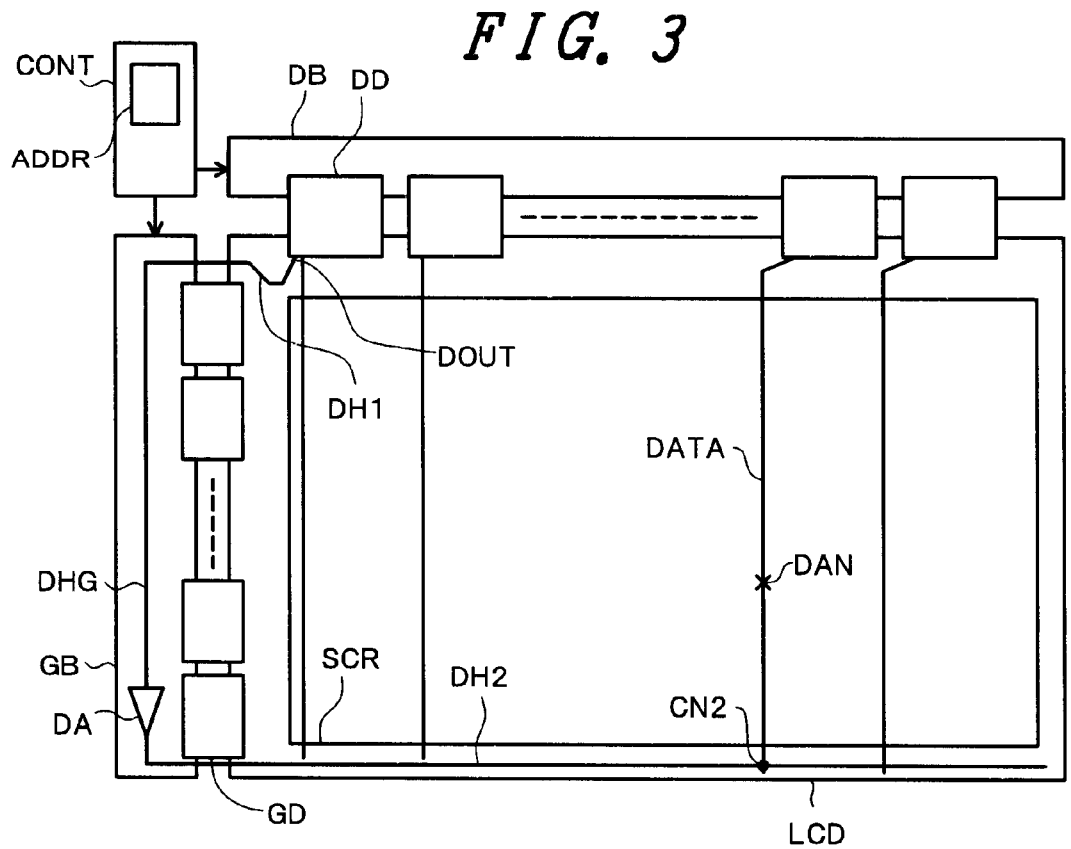
FIG. 3 is a schematic plan view of a liquid crystal display element and driver circuit boards disposed around the periphery of the liquid crystal display element, in accordance with another embodiment of the present invention.

FIG. 3 is a schematic plan view of a liquid crystal display element and driver circuit boards disposed around the periphery of the liquid crystal display element, in accordance with another embodiment of the present invention.

This embodiment is substantially similar to Embodiment 1, except that (i) the first line-open repair lines DH1 is connected to an unused one of signal output pins of the video signal driver DD (the driver IC chip) which is not connected to the video signal lines DATA and is hereinafter referred to as a line-open repair video signal output DOUT, and (ii) an address input ADDR for the repair of the line opens is provided in the control circuit board CONT.

The address input ADDR for the repair of the line opens designates the address of the video signal line DATA suffering a line open detected by the inspection for line opens, to the line-open repair video signal output DOUT.

The line-open repair video signal output DOUT is allotted an unused output pin of the video signal driver DD which is not connected to the video signal lines DATA in the useful display area, and outputs a video signal designated by the address input ADDR for the repair of the line opens.

In this embodiment shown in FIG. 3, it is assumed that the line open occurred in the video signal line DATA connected to the second remotest video signal driver DD from the scanning signal driver GD side (the repair line DHG side) of the liquid crystal display element LCD, and the line open is repaired by obtaining an intended video signal output from the unused output pin of the video signal driver DD nearest the scanning signal drivers GD. With this configuration, regardless of which of the video signal drivers DD the video signal line suffering the line open is connected to, the address input ADDR for the repair of the line opens specifies the video signal line suffering the line open and serves to supply the intended video signal to the line-open repair lines DHG and DH2 from the line-open repair video signal output DOUT of the video signal driver DD nearest the scanning signal drivers GD.

With this configuration also like in Embodiment 1, the video signal line DATA having the point of the line open DAN is supplied with approximately the same signals as those which would be supplied to the video signal line DATA having no line open, and consequently, a delicate difference in display brightness having a boundary on the point of the line open DAN due to the repair of the line open is suppressed.

This embodiment has the feature that the first line-open repair lines DH1 can be shortened by allotting an output pin of the driver IC chip at the extreme end to the line-open repair video signal output DOUT, thereby parasitic capacitances and resistance of the line-open repair line can be reduced and a time delay of the signals is suppressed, and consequently, the repair of the line opens can be realized to provide a higher-quality display image.

It is preferable in the embodiment shown in FIG. 3 that the line-open repair video signal output DOUT is provided at the video signal driver DD (the driver IC chip) nearest the repair line DHG on the liquid crystal display element LCD. It is desirable that an output pin among the output pins of the driver IC chip on the side nearer to the repair line DHG of the IC chip is allotted to the line-open repair video signal output DOUT, and it is more desirable that an output pin among the output pins of the driver IC chip nearest the repair line DHG is allotted to the line-open repair video signal output DOUT.

Embodiment 4

Figure 4:
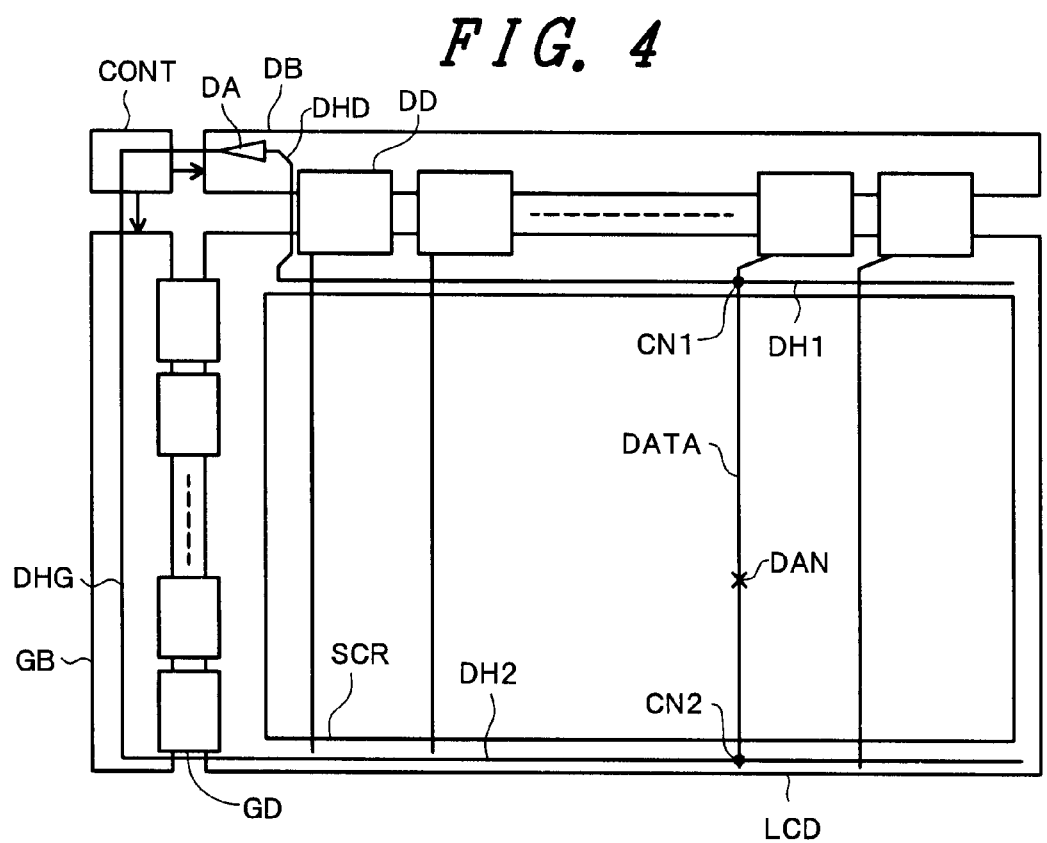
FIG. 4 is a schematic plan view of a liquid crystal display element and driver circuit boards disposed around the periphery of the liquid crystal display element, in accordance with still another embodiment of the present invention.

FIG. 4 is a schematic plan view of a liquid crystal display element and driver circuit boards disposed around the periphery of the liquid crystal display element, in accordance with still another embodiment of the present invention.

This embodiment is substantially similar to Embodiment 1, other than (i) another line-open repair line DHD is provided on the video signal source circuit board DB, (ii) the first line-open repair line DH1 is connected to the line-open repair line DHD, (iii) the signal amplifier DA is disposed on the video signal source circuit board DB, and (iv) the line-open repair line DHD is connected to the line-open repair line DHG disposed on the scanning signal source circuit board GB.

In this embodiment, the line-open repair line DHD and the line-open repair line DHG are connected together within the control circuit board CONT, but they may be directly connected together, not by way of the control circuit board CONT.

This embodiment has the feature that the signal amplifier DA can be placed nearer the video signal driver DD having connected thereto the video signal line DATA having the line open (see FIG. 1) because the signal amplifier DA is disposed on the video signal source circuit board DB, and consequently, this embodiment is less susceptible to time delays of signals and the repair of the line opens can be realized to provide a higher-quality display image.

Incidentally, the signal amplifier DA may be disposed on the control circuit board CONT.

Embodiment 5

Figure 5:
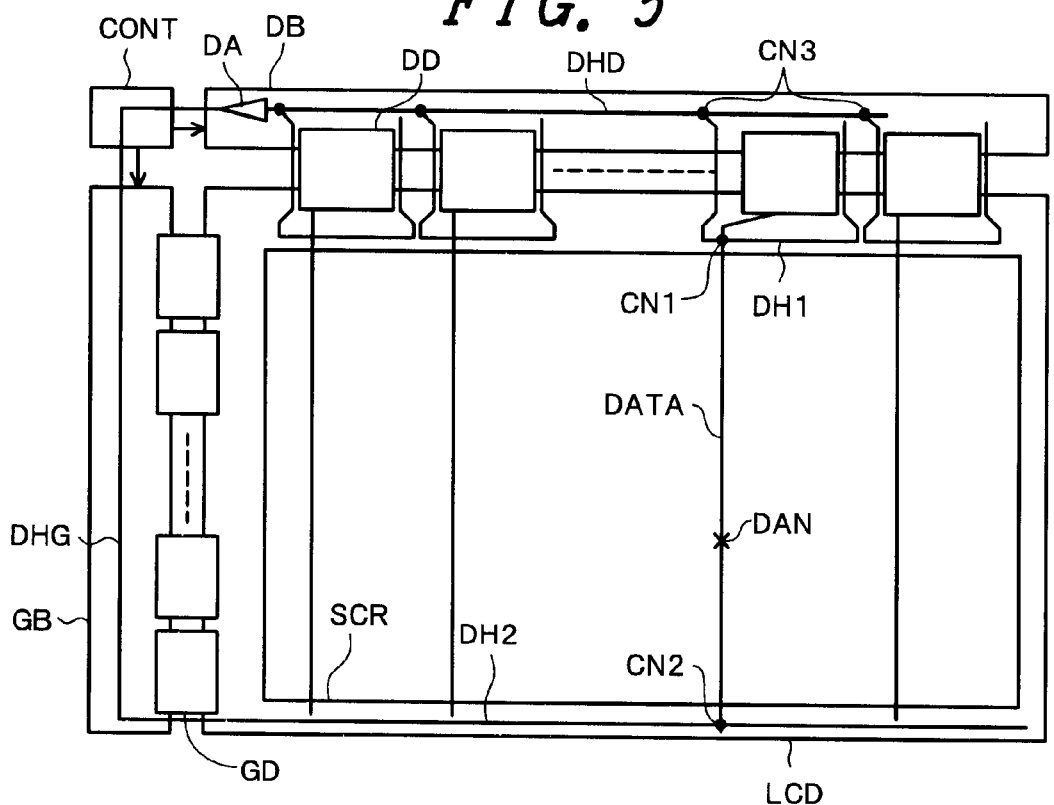
FIG. 5 is a schematic plan view of a liquid crystal display element and driver circuit boards disposed around the periphery of the liquid crystal display element, in accordance with still another embodiment of the present invention.

FIG. 5 is a schematic plan view of a liquid crystal display element and driver circuit boards disposed around the periphery of the liquid crystal display element, in accordance with still another embodiment of the present invention.

This embodiment is substantially similar to Embodiment 4, except that (i) one first line-open repair line DH1 is provided for each of the video signal drivers DD, and (ii) each of the first line-open repair lines DH1 is connected to the line-open repair line DHD disposed on the video signal source circuit board DB.

In this embodiment also, the line-open repair line DHD and the line-open repair line DHG are connected together within the control circuit board CONT, but they may be directly connected together, not by way of the control circuit board CONT.

This embodiment has the feature that the length of wiring between the line-open repair connection point CN1 and the line-open repair line DHD can be shortened because one line-open repair line DH1 is provided for each of the video signal drivers DD, and consequently, this embodiment is less susceptible to time delays of signals and the repair of the line opens can be realized to provide a higher-quality display image.

Embodiment 6

Figure 6:
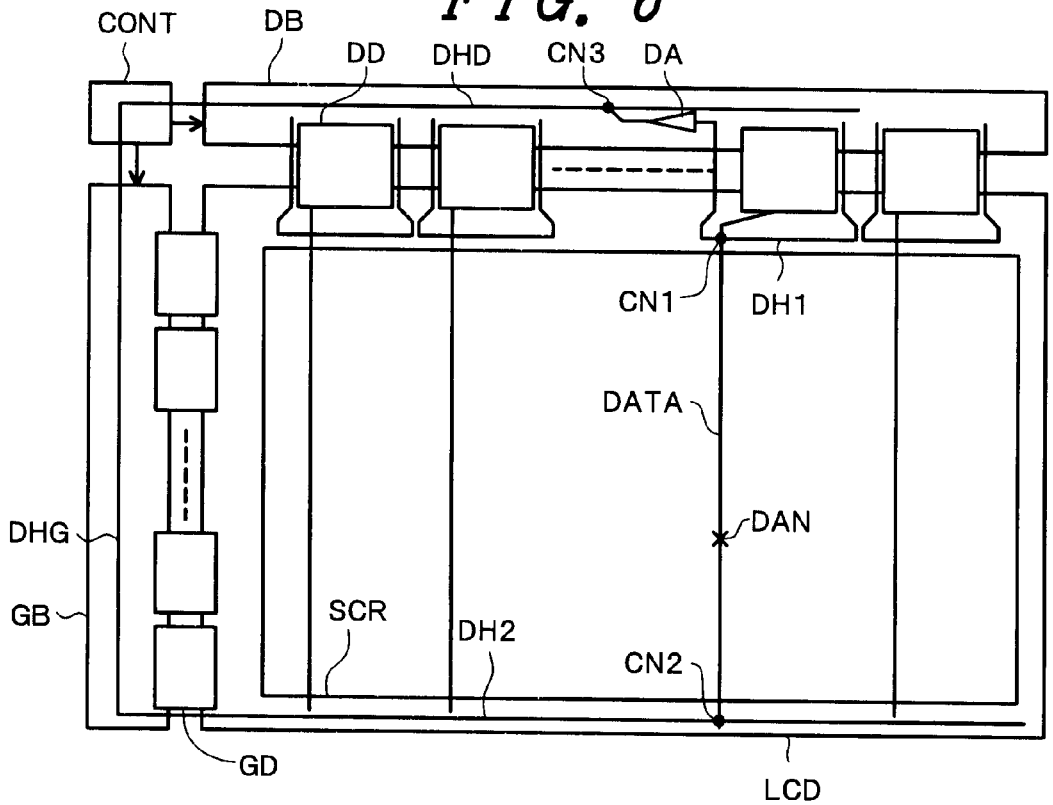
FIG. 6 is a schematic plan view of a liquid crystal display element and driver circuit boards disposed around the periphery of the liquid crystal display element, in accordance with still another embodiment of the present invention.

FIG. 6 is a schematic plan view of a liquid crystal display element and driver circuit boards disposed around the periphery of the liquid crystal display element, in accordance with still another embodiment of the present invention.

This embodiment is substantially similar to Embodiment 5, except that (i) the line-open repair connection point CN3 is provided on the video signal source circuit board DB, (ii) the signal amplifier DA is inserted between the first line-open repair line DH1 and the line-open repair connection point CN3, and (iii) only one line-open repair connection point CN3 is provided on the line-open repair line DHD.

In this embodiment also, the line-open repair line DHD and the line-open repair line DHG are connected together within the control circuit board CONT, but they may be directly connected together, not by way of the control circuit board CONT.

In this embodiment, the line-open repair connection point CN3 is disposed on the video signal source circuit board DB, and therefore electrical connection at the line-open repair connection point CN3 can be made by soldering, or other various methods.

This embodiment has the feature that only one line-open repair connection point CN3 is provided on the line-open repair line DHD, therefore noise in video signals other than noise introduced from the video signal line DATA connected to the line-open repair connection point CN3 can be reduced, and this embodiment is less susceptible to time delays of signals and the repair of the line opens can be realized to provide a higher-quality display image because the signal amplifier DA can be disposed nearer the line-open repair connection point CN1.

Outline of the Matrix Area

Figure 7:
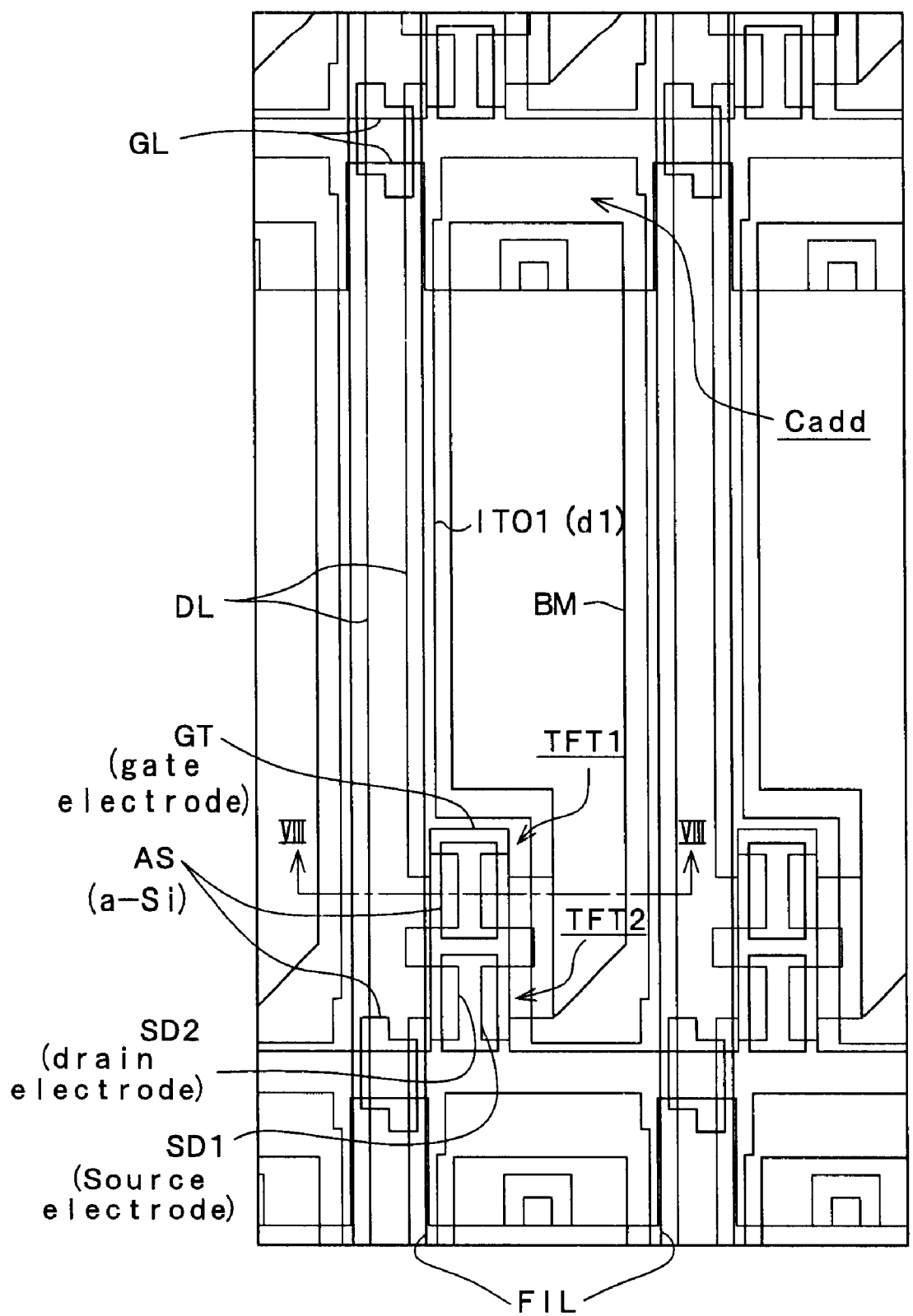
FIG. 7 is a plan view of a pixel and its vicinity in an active matrix type color liquid crystal display element to which the present invention is applicable.
Figure 8:
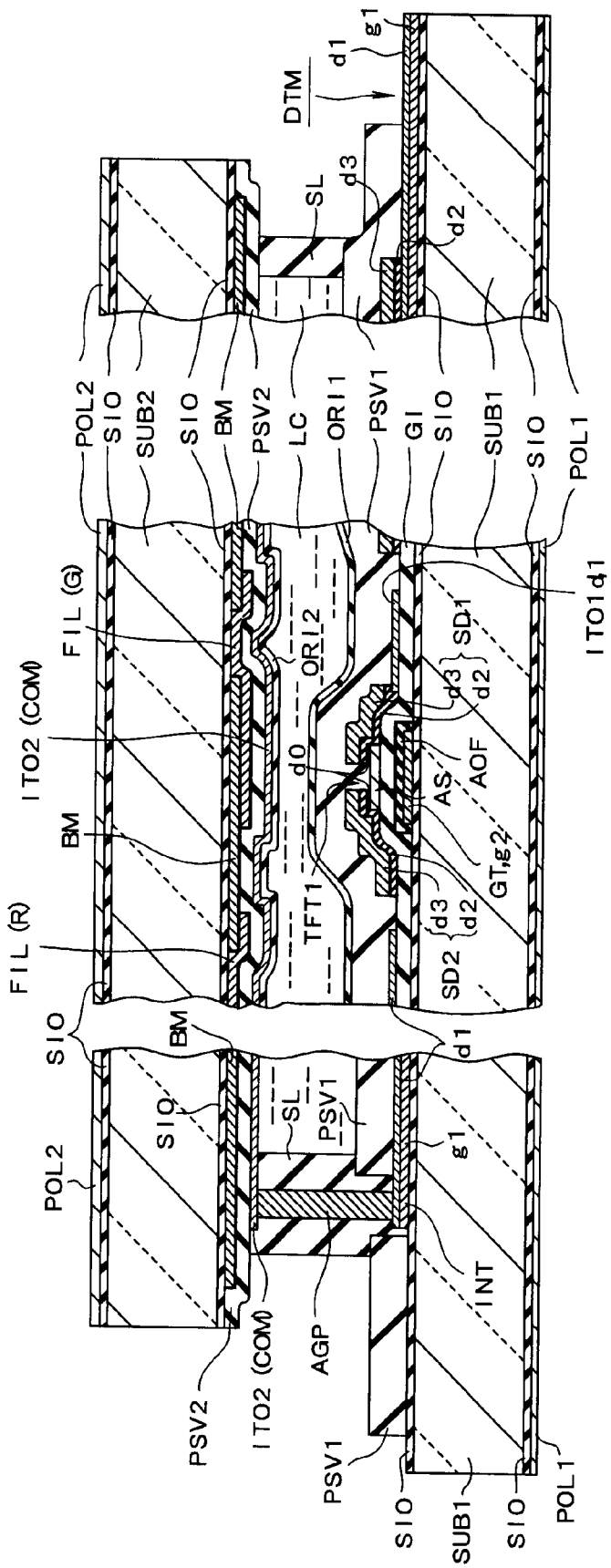
FIGS. 8A, 8B and 8C are cross sectional views of a corner portion, a pixel area in a matrix portion and a video terminal portion connected to a video signal driver circuit of the liquid crystal display element, respectively.

FIG. 7 is a plan view of a pixel and its vicinity in an active matrix type color liquid crystal display element to which the present invention is applicable, FIG. 8A is a cross-sectional view of a corner portion of a display panel of the liquid crystal display element, FIG. 8B is a cross-sectional view of the pixel and its vicinity taken along the line VIII—VIII of FIG. 7, and FIG. 8C is a cross sectional view of a portion of the display panel of the liquid crystal display element in the vicinity of a video signal terminal DTM to be connected to a video signal driver circuit.

As shown in FIG. 7, each pixel is disposed in an area defined by two adjacent scanning signal lines (also referred to as gate signal lines or horizontal signal lines) GL and two adjacent video signal lines (also referred to as drain signal lines or vertical signal lines) DL. Each pixel includes two thin film transistors TFT1, TFT2, a transparent pixel electrode ITO1 and a holding capacitor Cadd. The plural scanning signal lines GL extending horizontally are arranged vertically. The plural video signal lines DL extending vertically are arranged horizontally.

As shown in FIGS. 8A–8C, two thin film transistors TFT1, TFT2 and a transparent pixel electrode ITO1 are formed on a side of a lower transparent glass substrate SUB1 facing a liquid crystal layer LC, and a color filter FIL and a black matrix pattern BM for blocking of light are formed on a side of an upper transparent glass substrate SUB2 facing the liquid crystal layer LC. Both surfaces of the transparent glass substrates SUB1, SUB2 are coated with silicon oxide SIO using a dip technique or the like.

Stacked on the inner surface of the upper transparent glass substrate SUB 2 (the side of the upper transparent glass substrate SUB 2 facing the liquid crystal layer LC) are the black matrix pattern BM, the color filter FIL, a protective film PSV2, a transparent common pixel electrode ITO2 (COM) and an upper orientation film ORI2 in the order named.

Equivalent Circuit of the Liquid Crystal Display Module

Figure 9:
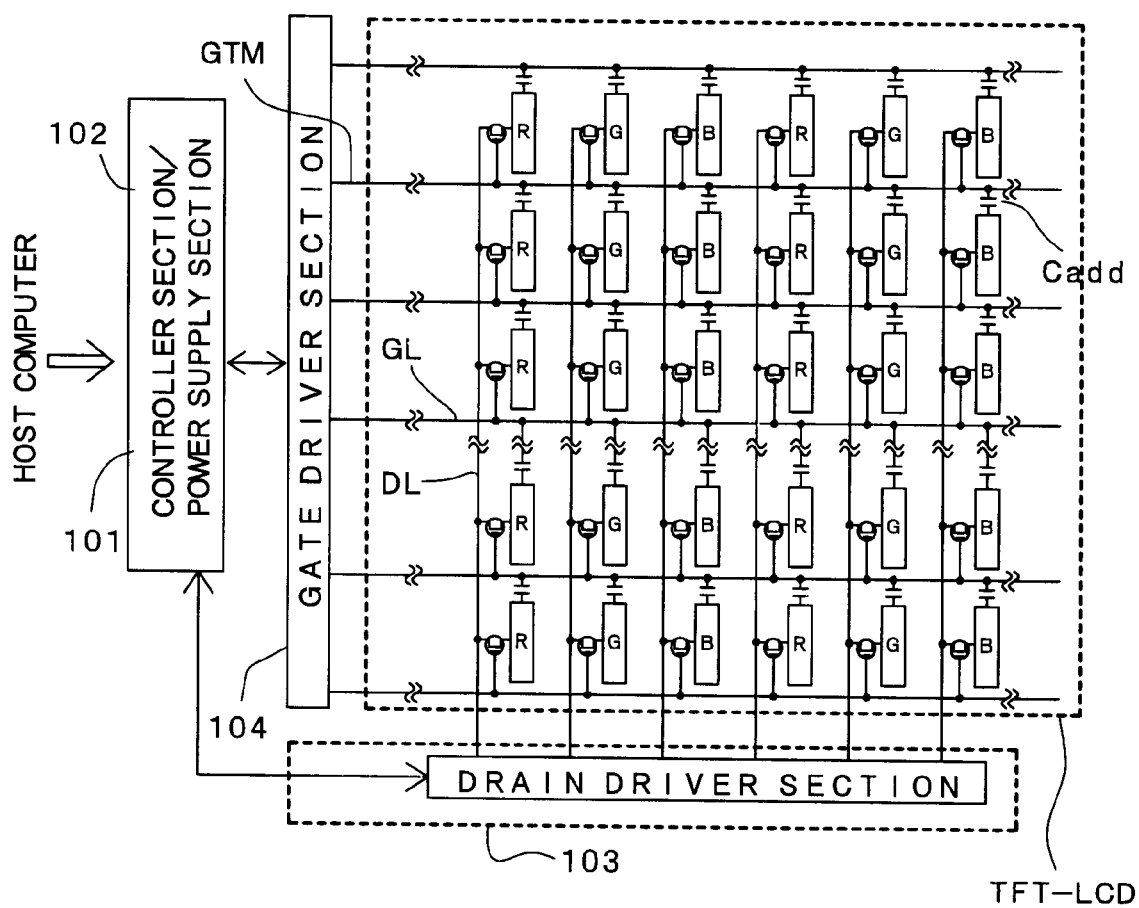
FIG. 9 is a block diagram showing an equivalent circuit of the liquid crystal display module.

FIG. 9 is a block diagram for illustrating the liquid crystal display element and a circuit disposed around the periphery of the liquid crystal display element. A drain driver section 103 is disposed only at the bottom of the TFT liquid crystal display element (TFT-LCD). A gate driver section 104, a controller section 101 and a power supply section 102 are arranged at one side of the TFT liquid crystal display element (TFT-LCD) having 800×3×600 pixels complying with the XGA specification.

The drain driver section 103 can be designed to be sufficiently compact by using a multilayer flexible substrate and mounting it by bending.

The controller section 101 and the power supply section 102 are mounted on a multilayer printed circuit board PCB. The interface board PCB mounting the controller section 101 and the power supply section 102 is disposed behind the gate driver section 104 arranged outside the short side of the liquid crystal display element PNL. This is because the width of the module MDL serving as a display section also needs to be made as small as possible because of the restriction placed on the width of information processing equipment.

As shown in FIG. 9, a pair of thin film transistors TFT are arranged in each area defined by two adjacent drain signal lines DL and two adjacent gate signal lines GL.

A drain electrode and a gate electrode of the thin film transistors TFT are connected to the drain signal line DL and the gate signal line GL, respectively.

A source electrode of the thin film transistor TFT is connected to a pixel electrode, a liquid crystal layer is disposed between the pixel electrode and the common electrode, and therefore a liquid crystal capacitance is interposed between the common electrode and the source electrode of the thin film transistor TFT in an electrical equivalent circuit.

The thin film transistor TFT is turned on if a positive bias voltage is applied to the gate electrode, and it is turned off if a negative bias voltage is applied to the gate electrode.

A holding capacitance Cadd is interposed between a gate signal line directly above and the source electrode of the thin film transistor TFT.

Incidentally, source and drain electrode designation depend upon the polarity of a bias voltage applied between the source and drain electrodes, the polarity of the bias voltage is reversed during the operation of the liquid crystal display device, and therefore it is to be noted that the roles of the source and drain electrodes are interchanged during the operation of the liquid crystal display device.

Overall Structure of the Liquid Crystal Display Module

Figure 10:
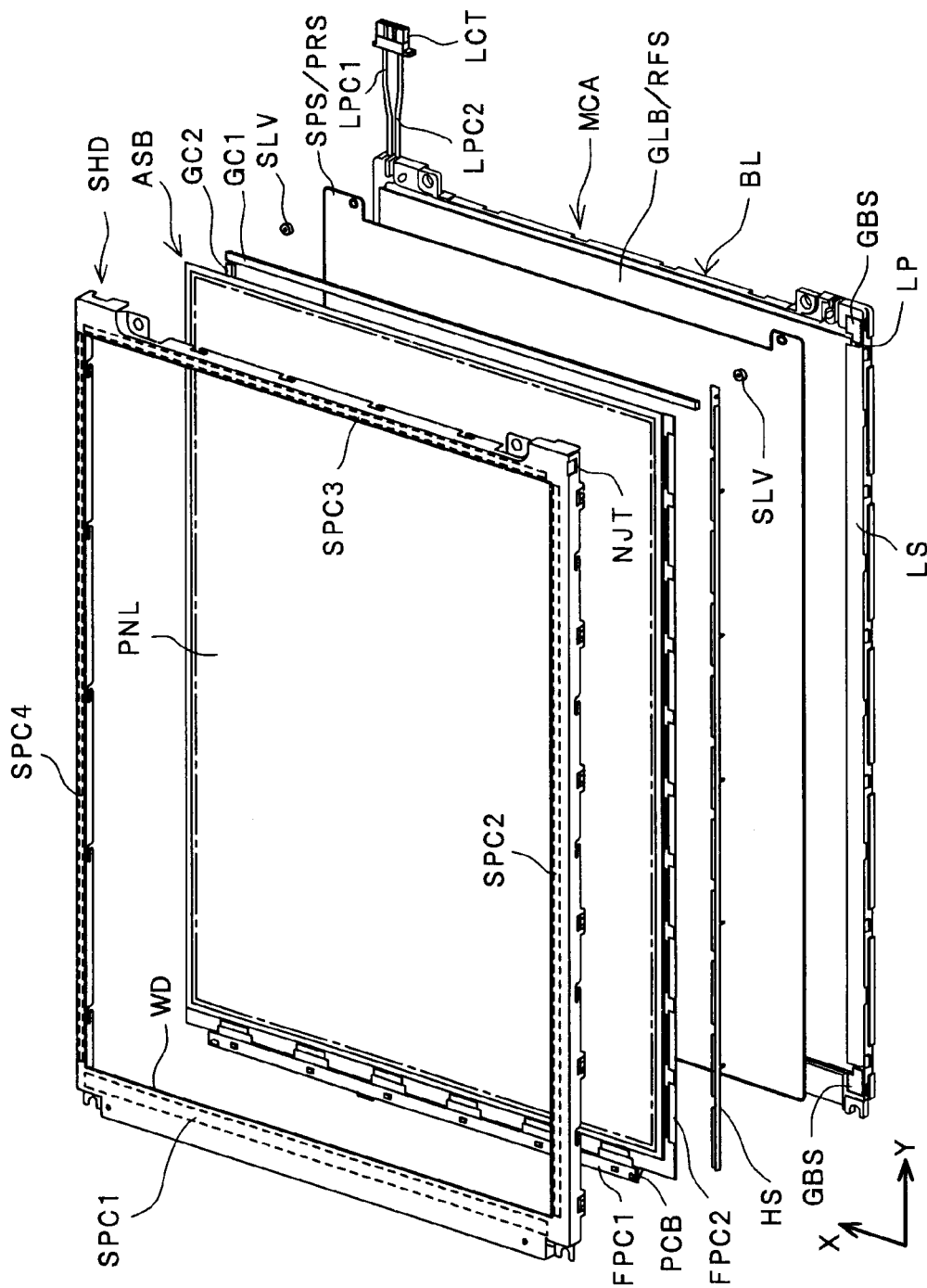
FIG. 10 is an exploded perspective view of the flip chip type liquid crystal display module.

FIG. 10 is an exploded perspective view of the flip chip type liquid crystal display module MDL.

Reference character SHD designates a shield case made of a metal plate (or a metal frame); WD is a display window; SPC1 to SPC4 are insulating spacers; FPC1 and FPC2 are folded multilayer flexible circuit boards (FPC1 is the circuit board for gate drive and FPC2 is the circuit board for drain drive); PCB is an interface circuit board; ASB is an assembled liquid crystal display element with the driver circuit boards; PNL is a liquid crystal display element having driver ICs mounted on one of a pair of transparent insulating substrates overlapped and fixed with a spacing therebetween (or a liquid crystal display panel); GC1 and GC2 are rubber cushions; PRS are prismatic sheets (two sheets); SPS is a light-diffusing sheet; GLB is a light guide; RFS is a reflecting sheet; MCA is a lower case (a molded case) integrally molded; LP is a fluorescent lamp; LPC1 and LPC2 are lamp cables; LCT is a connector for an inverter power source; and GBS is a rubber bushing for holding the fluorescent lamp LP. These components are stacked in the vertical arrangement relationship shown in FIG. 10, and are assembled into the liquid crystal display module MDL.

Figure 11:
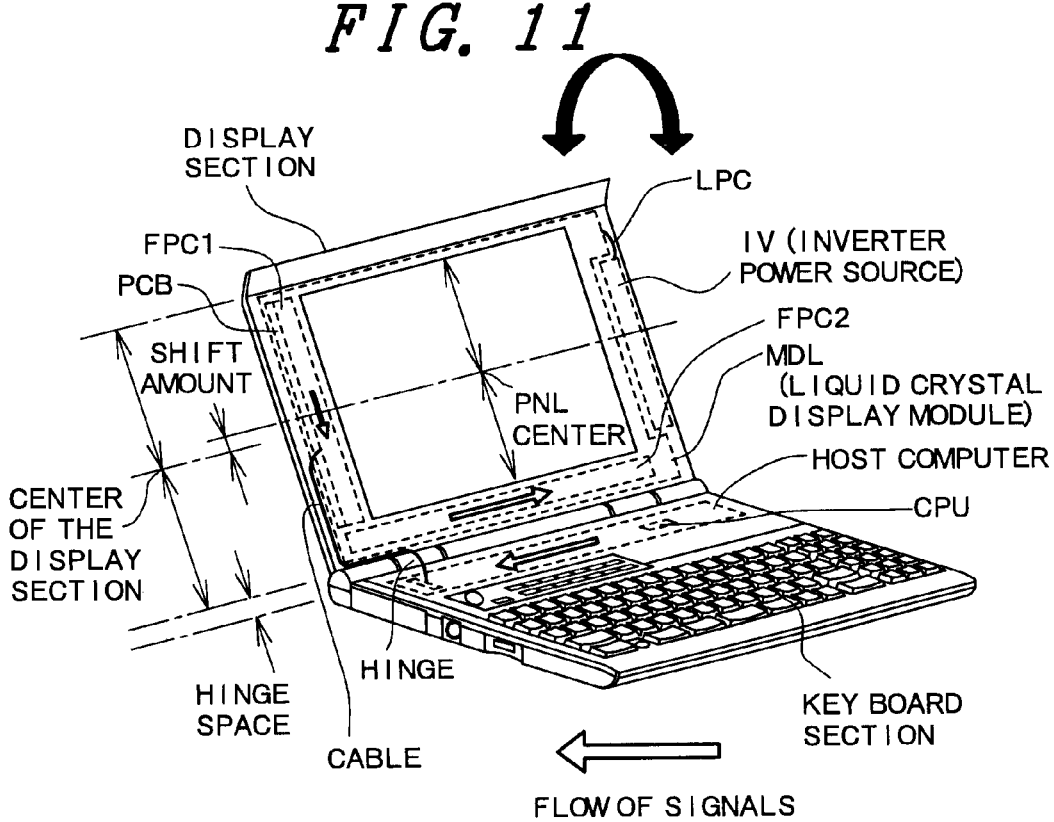
FIG. 11 is a perspective view of a notebook personal computer or word processor incorporating the liquid crystal display module.
Figure 12:
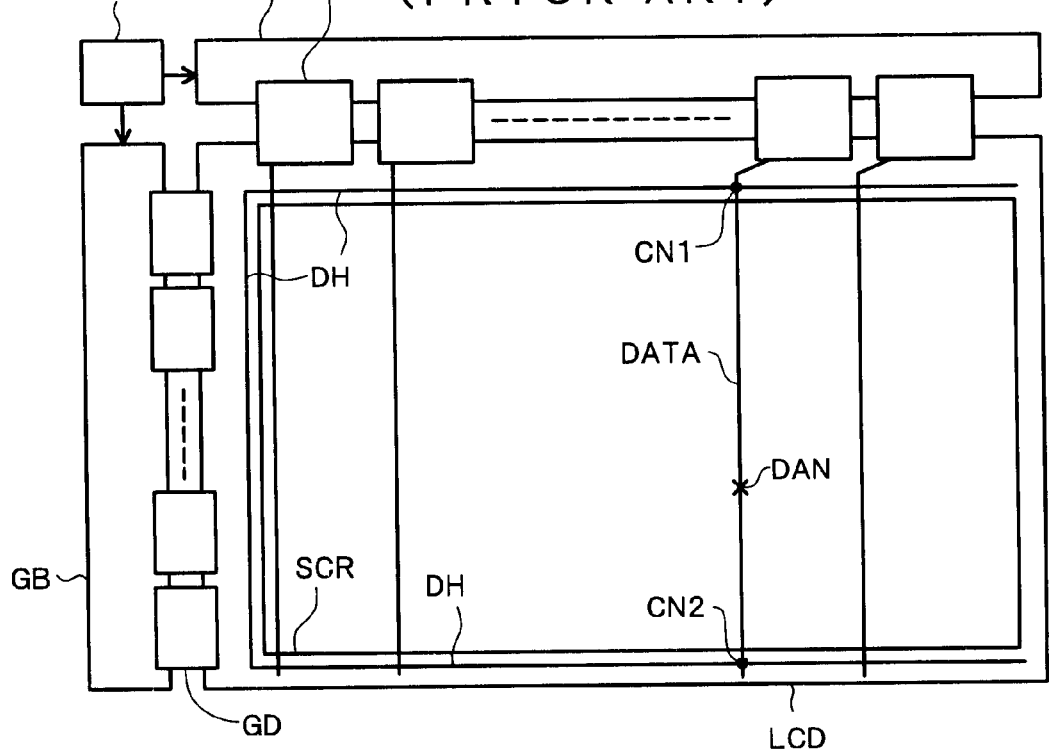
FIG. 12 is a schematic plan view of a conventional liquid crystal display element and driver circuit boards therefor.

Information Processing Equipment Incorporating the Liquid Crystal Display Module MDL FIG. 11 is a perspective view of a notebook personal computer or word processor incorporating the liquid crystal display module MDL, wherein an inverter power source IV is disposed in the display section, that is, in the inverter housing section of the liquid crystal display module MDL.

The driver ICs are mounted on the liquid crystal display element PNL by a COG (Chip On Glass) technology, drain and gate driver circuits disposed at the periphery of the liquid crystal display element PNL are mounted on multilayer flexible circuit boards, the drain driver circuits are mounted in the bent form, and consequently, the external size of the liquid crystal display device can be reduced greatly compared with the conventional liquid crystal display device. In this embodiment, the drain driver circuit disposed on only one side of the liquid crystal display element PNL can be arranged at the top of the display section above a hinge of the information processing equipment, and thereby compact mounting can be realized.

Signals from the information processing equipment are first supplied to the integrated circuit device for display control via a connector positioned at approximately a center of the interface circuit board PCB on the left-hand part of the equipment, are subjected to data conversion, and the display data are transmitted to the peripheral circuit for drain driving. By using the flip chip technique and the multilayer flexible circuit board as described above, it is possible to remove the restriction on the outside width of the information processing equipment, and hence to realize the miniaturization and low power consumption of the information processing equipment.

The present invention has been explained concretely by referring to the embodiments, but the present invention is not limited to the above embodiments, and it will be obvious to those skilled in the art that various changes and modifications may be made without departing from the true spirit and scope of the present invention. For example, the present invention is applicable to the lateral electric field (In-Plane Switching), active-matrix type liquid crystal display device. For the purpose of device construction and operation of the liquid crystal display device of the lateral electric field type, U.S. Pat. No. 5,598,285, issued to Kondo et al. on Jan. 28, 1997, is hereby incorporated by reference.

While the present invention is applied to the line opens in the video signal lines in the above embodiments, the present invention is also applicable to the line opens in the scanning signal lines.

As explained above, the liquid crystal display device in accordance with the present invention is capable of repairing the line opens in the signal lines such that occurrence of variations in brightness of the display screen in the vicinity of the repair points is suppressed to provide a high quality display image and a high manufacturing yield.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device, comprising:
   a pair of opposing substrates at least one of which is transparent;
   a liquid crystal layer sandwiched between said pair of opposing substrates;

a plurality of scanning signal lines extending in a first direction on a surface of one of said pair of opposing substrates facing said liquid crystal layer and arranged in a second direction transverse to said first direction;

a plurality of video signal lines insulated from said plurality of scanning signal lines, extending in said second direction and arranged in said first direction;

a plurality of pixel electrodes arranged in a matrix and each surrounded by two adjacent ones of said plurality of video signal lines and two adjacent ones of said plurality of scanning signal lines;

a plurality of active elements each associated with one of said plurality of pixel electrodes, an output electrode thereof being connected to one of said plurality of pixel electrodes, a control electrode thereof being connected to one of said plurality of scanning signal lines and an input electrode thereof being connected to one of said plurality of video signal lines;

a plurality of video signal line driver circuits arranged along a first side of said one of said pair of opposing substrates outside said matrix, each of which supplies video signal voltages to respective ones of said plurality of video signal lines;

a video signal source circuit board arranged at said first side of said one of said pair of opposing substrates and supplying control signals and DC voltages to said plurality of video signal line driver circuits;

a plurality of scanning signal line driver circuits arranged along a second side of said one of said pair of opposing substrates adjacent to said first side thereof outside said matrix, each of which supplies scanning signal voltages to respective ones of said plurality of scanning signal lines;

a scanning signal source circuit board arranged at said second side of said one of said pair of opposing substrates and supplying control signals and DC power to said plurality of scanning signal line driver circuits;

a first line-open repair line provided at said first side of said one of said pair of opposing substrates and being electrically connectable to one of said plurality of video signal lines near one of output terminals of said video signal driver circuits;

a second line-open repair line extending along a third side of said one of said pair of opposing substrates opposite to said first side thereof and being electrically connectable to another end of said one of said plurality of video signal lines;

a third line-open repair line provided on said scanning signal source circuit board; and a fourth line-open repair line provided on said video signal source circuit board, wherein a signal amplifier is provided on said video signal source circuit board and connected to said fourth line-open repair line, said first line-open repair line is electrically connected to said fourth line-open repair line, said fourth line-open repair line is electrically connected to said third line-open repair line, and said third line-open repair line is electrically connected to said second line-open repair line.

2. The liquid crystal display device according to claim 1, wherein said plurality of video signal line driver circuits are incorporated on tape carrier packages mounted between said first side of said one of said pair of opposing substrates and said video signal source circuit board, respectively.

3. The liquid crystal display device according to claim 1, further comprising a control circuit board converting signals and electrical power supplied externally thereto into control signals and electrical power to be supplied to said plurality of video signal line driver circuits and said plurality of scanning signal line driver circuits, wherein said third line-open repair line and said fourth line-open repair line are connected together within said control circuit board.

4. The liquid crystal display device according to claim 1, wherein said first line-open repair line is provided for each of said plurality of video signal line driver circuits, and a plurality of first line-open repair lines are connected to said fourth line-open repair line on said video signal source circuit board, respectively.

5. A liquid crystal display device, comprising:

a pair of opposing substrates at least one of which is transparent;

a liquid crystal layer sandwiched between said pair of opposing substrates;

a plurality of scanning signal lines extending in a first direction on a surface of one of said pair of opposing substrates facing said liquid crystal layer and arranged in a second direction transverse to said first direction;

a plurality of video signal lines insulated from said plurality of scanning signal lines, extending in said second direction and arranged in said first direction;

a plurality of pixel electrodes arranged in a matrix and each surrounded by two adjacent ones of said plurality of video signal lines and two adjacent ones of said plurality of scanning signal lines;

a plurality of active elements each associated with one of said plurality of pixel electrodes, an output electrode thereof being connected to one of said plurality of pixel electrodes, a control electrode thereof being connected to one of said plurality of scanning signal lines and an input electrode thereof being connected to one of said plurality of video signal lines;

a plurality of video signal line driver circuits arranged along a first side of said one of said pair of opposing substrates outside said matrix, each of which supplies video signal voltages to respective ones of said plurality of video signal lines; and a plurality of scanning signal driver circuits arranged along a second side of said one of said pair of opposing substrates adjacent to said first side thereof outside said matrix, each of which supplies scanning signal voltages to respective ones of said plurality of scanning signal lines, wherein one of said plurality of video signal line driver circuits nearest to said second side of said one of said pair of opposing substrates has another video signal output not connected to said plurality of video signal lines, a line-open repair line is connected to said another video signal output, extended along said second side of said one of said pair of opposing substrates, and then extended on said one of said pair of opposing substrates at a third side thereof opposite to said first side thereof, and said line-open repair line is electrically connectable to one of said plurality of video signal lines at said third side thereof.

6. The liquid crystal display device according to claim 5, further comprising a signal control circuit having an address input provided therein, wherein said line-open repair line is connected to said one of said plurality of video signal lines having a line open therein at said third side of said one of said pair of opposing substrates, and said another video signal output is allotted for outputting a video signal to be supplied to said one of said plurality of video signal lines by said address input.

7. The liquid crystal display device according to claim 5, wherein a signal amplifier is interposed between said line-open repair line and said another video signal output.

8. The liquid crystal display device according to claim 5, further comprising a circuit board connected to said one of said pair of opposing substrates at said second side thereof and supplying control signals and DC power to said plurality of scanning signal line driver circuits, wherein said line-open repair line is extended on said circuit board along said second side of said one of said pair of opposing substrates.

9. A liquid crystal display device, comprising:

a liquid crystal display panel having a display area in which a plurality of pixels are arranged;

first signal driver circuits arranged along a first side of the liquid crystal display panel and second signal driver circuits arranged along a second side of the liquid crystal display panel adjacent to the first side of the liquid crystal display panel, either ones of which supply video signals to respective groups of the plurality of pixels while the other ones thereof input scanning signals to the display area;

a first circuit board connected to the liquid crystal display panel at the first side thereof and supplying control signals to the first signal driver circuits;

a second circuit board connected to the liquid crystal display panel at the second side thereof and supplying control signals to the second signal driver circuits;

a plurality of signal lines arranged across the display area along the first side of the liquid crystal display panel, each of which receives a signal output from one of the first signal driver circuits at the first side of the liquid crystal display panel and is extended to a third side thereof opposite to the first side thereof;

a first conductive line provided at the first side of the liquid crystal display panel to be electrically connectable to one of the plurality of signal lines outside the display area;

a second conductive line extended in the liquid crystal display panel along the third side thereof to be electrically connectable to an end of the one of the plurality of signal lines outside the display area;

a third conductive line provided on the second circuit board; and a fourth conductive line provided on the first circuit board and connected to the first conductive line on the first circuit board, wherein the first conductive line, the fourth conductive line, the third conductive line, and the second conductive line are electrically connected in this order, and a signal amplifier is provided on the first circuit board and connected to the fourth conductive line.

10. The liquid crystal display device according to claim 9, wherein the first signal driver circuits receive DC voltages together with the control signals transmitted through the first circuit board and output video signals, while the second signal driver circuits receive DC power together with the control signals transmitted through the second circuit board and output the scanning signals, respectively.

11. The liquid crystal display device according to claim 9, wherein the first signal driver circuits are incorporated on tape carrier packages mounted respectively between the first side of the liquid crystal display panel and the first circuit board, respectively.

12. The liquid crystal display device according to claim 9, further comprising a control circuit board converting signals and electrical power supplied externally thereto into control signals and electrical power to be supplied to the first signal driver circuits and the second signal driver circuits, wherein the third conductive line and the fourth conductive line are connected together within the control circuit board.

13. A liquid crystal display device, comprising:

a liquid crystal display panel having a display area in which a plurality of pixels are arranged;

first signal driver circuits arranged along a first side of the liquid crystal display panel and second signal driver circuits arranged along a second side of the liquid crystal display panel adjacent to the first side of the liquid crystal display panel, either ones of which supply video signals to respective groups of the plurality of pixels while the other ones thereof input scanning signals to the display area;

a first circuit board connected to the liquid crystal display panel at the first side thereof and supplying control signals to the first signal driver circuits;

a second circuit board connected to the liquid crystal display panel at the second side thereof and supplying control signals to the second signal driver circuits;

a plurality of signal lines arranged across the display area along the first side of the liquid crystal display panel, each of which receives a signal output from one of the first signal driver circuits at the first side of the liquid crystal display panel and is extended to a third side thereof opposite to the first side thereof;

a plurality of first line-open repair lines, each of which is provided for a respective one of the first signal driver circuits at the first side of the liquid crystal display panel to be electrically connectable to one of the plurality of signal lines connected to the one of the first signal driver circuits outside the display area;

a second line-open repair line extended in the liquid crystal display panel along the third side thereof to be electrically connectable to an end of the one of the plurality of signal lines outside the display area;

a third line-open repair line provided on the second circuit board; and a fourth line-open repair line provided on the first circuit board, wherein the fourth line-open repair line, the third line-open repair line, and the second line-open repair line are electrically connected in this order, one of the plurality of first line-open repair lines and the fourth line-open repair line are electrically connected through a signal amplifier provided on the first circuit board, and the others of the plurality of first line-open repair lines are not electrically connected to the fourth line-open repair line.

14. A liquid crystal display device, comprising:

a liquid crystal display panel having a display area including a plurality of pixels, in which a plurality of signal lines are arranged across the display area along a first side of the liquid crystal display panel and each of the plurality of signal lines is extended along a second side of the liquid crystal display panel adjacent to the first side thereof;

a plurality of signal driver circuits arranged along the first side of the liquid crystal display panel, each of which has a plurality of output terminals connected to respective ones of the plurality of signal lines outside the display area at the first side thereof; and a line-open repair line connected to another output terminal of one of the plurality of signal driver circuits, which is extended along the second side of the liquid crystal display panel, and then extended in the liquid crystal display panel at a third side thereof adjacent to the second side thereof to be connectable to one of the plurality of signal lines at the third side thereof outside the display area, wherein the one of the plurality of signal driver circuits is disposed nearest the second side of the liquid crystal display panel in the plurality of signal driver circuits, and the another output terminal of the one of the plurality of signal driver circuits is not connected to any of the plurality of signal lines.

15. The liquid crystal display device according to claim 14, further comprising a control circuit board supplying control signals to the plurality of signal driver circuits, wherein the control circuit board has an address input provided therein, which allots a video signal output from the another output terminal of the one of the plurality of signal driver circuits for the one of the plurality of signal driver circuits.

16. The liquid crystal display device according to claim 14, further comprising a circuit board arranged along the second side of the liquid crystal display panel and another signal driver circuit disposed on the circuit board and connected to the liquid crystal display panel at the second side thereof, wherein a part of the line-open repair line extended along the second side of the liquid crystal display panel is arranged on the circuit board.

* * * * *